Nov. 28, 1950 W. A. REICHEL 2,531,826
GYROSCOPE ERECTING SYSTEM
Filed Sept. 5, 1946 5 Sheets-Sheet 1

Fig. 1.

INVENTOR
WLADIMIR A. REICHEL
BY
ATTORNEY

Fig. 2.

INVENTOR
WLADIMIR A. REICHEL
BY
ATTORNEY

Nov. 28, 1950  W. A. REICHEL  2,531,826
GYROSCOPE ERECTING SYSTEM
Filed Sept. 5, 1946  5 Sheets-Sheet 3

Fig. 3.

INVENTOR
WLADIMIR A. REICHEL
BY
ATTORNEY

Patented Nov. 28, 1950

2,531,826

UNITED STATES PATENT OFFICE 2,531,826

GYROSCOPE ERECTING SYSTEM

Wladimir A. Reichel, Hackensack, N. J., assignor, by mesne assignments, to Kearfott Company, Inc., New York, N. Y., a corporation of New York Application September 5, 1946, Serial No. 695,060

11 Claims. (Cl. 74—5.47)

This invention relates to an electrical erecting system for a vertical indicating gyroscope and has for an object to provide a system of the above type having novel and improved operating characteristics.

Another object is to provide a system of the above type including control pendulums which are connected to the gyroscope by an electrical synchronous transmission system which controls circuits for actuating precession torque motors to maintain the spin axis of the gyroscope vertical.

Another object is to so connect the transmission system that it may be extended to give indications or to control a member at a distance in accordance with the angular positions of the gyroscope relative to the craft on which it is mounted.

Another object of this invention is to provide novel and improved means for preventing the gyroscope from following movements of the pendulums due to excessive acceleration and deceleration forces such as those produced by a change in speed or course of the craft.

Another object is to provide a system of the above type in which the erecting forces are proportional to the displacement.

Various other objects and advantages will be apparent as the nature of the invention is more fully disclosed.

The gyroscope may be mounted on the usual gimbal suspension with its axes of movement aligned respectively with the pitch and roll axes of the craft. Pitch and roll pendulums are provided and are mounted to maintain true vertical positions at all times except when influenced by acceleration forces. In accordance with the present invention transmitter units of an alternating current synchronous transmission system are mounted on the two axes of the gyroscope to be actuated by the gyroscope, and other units are controlled by the pendulums. These units are electrically connected and energized to respond to angular deviations of the direction of the spin axis of the gyroscope from the positions of the pendulums, and to produce correction signals proportional to such deviations. These signals are amplified and are utilized to actuate torque motors which may be of the two-phase induction type and are connected to apply precessing torques to the gyroscope about its mounting axes in the proper direction to cause the gyroscope to precess to bring its spin axis into agreement with the positions of the pendulums.

In normal operation the angular variations between the spin axis of the gyroscope and the pendulum are comparatively small as the system is operative at all times to restore the gyroscope whenever any variation begins to appear. However, forces due to acceleration may cause sudden movements of the pendulums through substantial arcs from the true vertical. In order to prevent the gyroscope from following these variations suitable provision is made in the amplifier to de-energize the control whenever the signal voltage exceeds a predetermined value corresponding to the variations normally expected between the pendulums and the gyroscope. When the amplifier is thus de-energized the control of the gyroscope by the pendulums is interrupted until the acceleration forces have been reduced to a value such that the variation between the pendulums and the spin axis of the gyroscope has been reduced to the predetermined value. For example, this value may be as small as a fraction of a degree, or as much as ten degrees, or even more, depending upon the characteristics of the craft on which it is mounted.

Although the novel features which are believed to be characteristic of this invention are pointed out more particularly in the claims appended hereto, the nature of the invention will be better understood by referring to the following description taken in connection with the accompanying drawings in which a specific embodiment thereof has been set forth for purposes of illustration.

Figure 4:
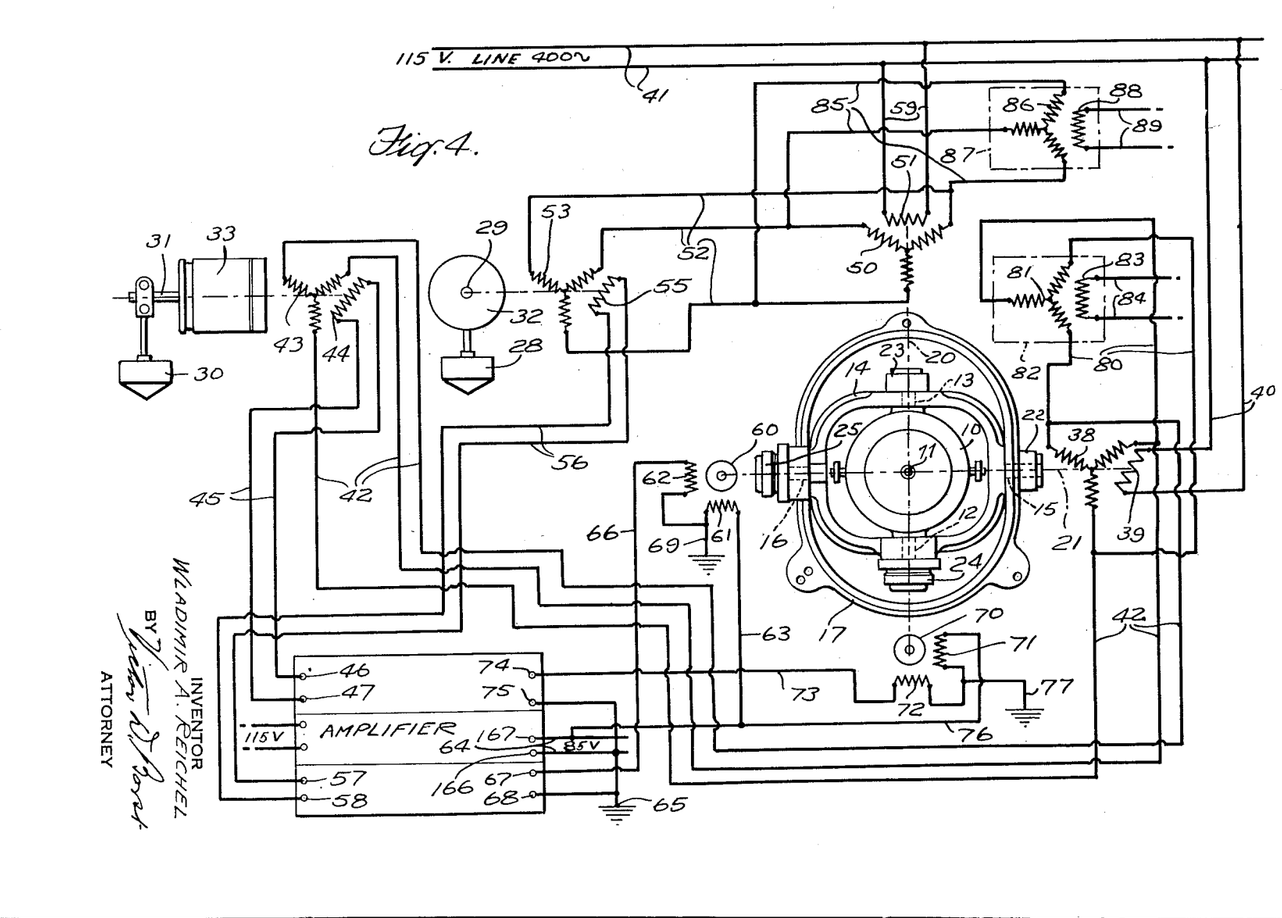
Fig. 4 is a schematic diagram of the erection system.

Referring particularly to the schematic diagram of Fig. 4, a gyroscope housing 10, containing the usual gyroscope which is mounted to rotate about a spin axis 11, is mounted by trunnions 12 and 13 to rotate in a gimbal ring 14 which in turn is mounted by trunnions 15 and 16 to rotate in a frame 17 which is adapted to be secured to a support 18 which is fixed with respect to the craft. The frame 17 is preferably mounted so that the axis 20 of the trunnions 12 and 13 is parallel to the fore-and-aft or roll axis of the craft while the axis 21 of the trunnions 15 and 16 is parallel to the transverse or pitch axis of the craft.

The trunnions 13 and 15 are connected to operate transmitting units 23 and 22 respectively of an alternating current self-synchronous transmission system, and the trunnions 12 and 16 are geared to torque motors 24 and 25 respectively. A pendulum 28 is pivotally mounted to swing about a shaft 29 the axis of which is parallel to the roll axis 20 and a pendulum 30 is pivotally mounted to swing about a shaft 31 the axis of which is parallel to the pitch axis 21. The shafts 29 and 31 control the rotors of units 32 and 33 of the transmission system.

The transmitter unit 22 is shown as comprising a Y connected stator winding 38 which remains fixed relative to the frame 17, and a rotor winding 39 which is mounted to turn with the trunnion 15 of the gimbal ring 14. The rotor winding 39 is shown as connected by lines 40 to be energized from an alternating current supply line 41. The stator winding 38 is connected by lines 42 to a Y connected stator winding 43 of the transmission unit 33, rotor winding 44 of which is connected by leads 45 to input terminals 46 and 47 of an amplifier to be described. The rotor winding 44 is mounted to turn with the shaft 31 as the pendulum 30 swings relative to the stator winding 43, which remains fixed relative to the frame 17 and the support 18.

The transmitter unit 23 comprises a stator winding 50 which remains fixed relative to the gimbal ring 14 and a rotor winding 51 which is mounted to be turned by the trunnion 13 in accordance with the movements relative to the ring 14 of the gyro-housing 10 about the axis 20. The stator winding 50 is connected by leads 52 to a stator winding 53 of transmission unit 32. Rotor winding 55 of the unit 32 is connected by leads 56 to input terminals 57 and 58 of the amplifier to be described. The rotor winding 51 is connected by leads 59 to the alternating current supply line 41.

The electrical elements of the torque motor 25 comprise a squirrel cage induction rotor 60, which is mounted to apply a torque to the gimbal ring 14 about the axis 21, and a pair of field windings 61 and 62. One end of the field winding 61 is shown as connected by a lead 63 to one side of an alternating current supply line 64, the other side of which is grounded at 65. One end of the field winding 62 is connected by a lead 66 to an output terminal 67 of the amplifier channel, the other output terminal 68 of which is grounded at 65. The other ends of the windings 61 and 62 are connected to a ground lead 69.

The torque motor 24 comprises a squirrel cage rotor 70, which is mounted to apply a torque to the gyroscope housing 10 about the axis 20, and a pair of field windings 71 and 72. One end of the winding 72 is connected by a lead 73 to an output terminal 74 of a second amplifier channel, the other terminal 75 of which is grounded at 65. One end of the winding 71 is connected by a lead 76 to the supply line 64. The other ends of the windings 71 and 72 are connected to a ground lead 77.

The stator winding 38 of the transmitter unit 22 is connected by leads 80 to the stator winding 81 of a unit 82 of the transmission system which may be remotely located and is provided with a rotor winding 83 which may be connected by leads 84 to actuate any suitable remote indicator or follow-up device.

The stator winding 50 of the transmitter unit 23 is connected by leads 85 to the stator winding 86 of a unit 87 of the transmission system which may also be remotely located and may have a rotor winding 88 connected by leads 89 to actuate a suitable remote indicator or follow-up device.

In the operation of the system thus far described the gyroscope in the housing 10 is assumed to be positioned with its spin axis 11 vertical and the pendulums 28 and 30 gravity actuated to maintain vertical positions. Suitable adjustments are then made so that zero voltages are induced in the rotor winding 44 of the unit 33 which indicates that the position of the rotor winding 44 corresponds to that of the rotor winding 39 of the transmitter unit 22. Any relative angular displacement between the spin axis 11 of the gyroscope and the pendulum 30 about the pitch axis 21 will cause a corresponding relative rotation of the rotor windings 39 and 44 and thereby cause an alternating voltage to be induced in the latter which is of a value proportional to the amount of relative angular displacement between the gyroscope and pendulum and is reversible in phase according to the direction of such displacement. This voltage constitutes a correction signal which is supplied to the input terminals 46 and 47 of the amplifier and produces a corresponding amplified alternating voltage at the output terminals 74 and 75. This output voltage is supplied to the control winding 72 of the torque motor 24 and is effective to produce a torque in the rotor 70 which is proportional to the angular displacement of the gyroscope from the pendulum and is applied to the gyroscope in a direction to precess the gyroscope about the axis 21 until its spin axis is restored to positional agreement with the pendulum 30, whereupon the rotor windings 39 and 44 will again be in synchronous positions and no voltage will be induced in the rotor winding 44.

Similarly, if the spin axis 11 of the gyroscope becomes displaced relative to the pendulum 28 about the roll axis 20, a relative displacement between the rotor windings 51 and 55 takes place, thereby inducing a voltage in the rotor winding 55 which is applied as a signal to the input terminals 57 and 58 of the amplifier and produces an alternating voltage at the output terminals 67 and 68 which is supplied to the control winding 62 of the torque motor 25. A torque proportional to the displacement of the gyroscope is thus produced in the rotor 60 in a direction to precess the gyroscope about the axis 20 until its spin axis 11 is restored to positional agreement with the pendulum 28, whereupon the rotor windings 51 and 55 are brought into synchronous positions and no signal voltage is developed in the rotor winding 55.

It will be evident from the above description that the spin axis 11 of the gyroscope is maintained vertical at all times and any deviation of the spin axis from the positions of the pendulums 28 and 30 is immediately corrected by the transmission system and torque motors above described.

As the displacement of the rotors of the vertical reference units 32 and 33 at the pendulums 28 and 31 and the rotors of the transmitter units 23 and 22 respectively are always the same under conditions of no acceleration there will be no voltage developed in rotors 44 and 55 except as required for correcting the position of the gyroscope. However, as the craft or gyro support 18 moves in roll and pitch about the gyro, displacement voltages are developed in rotor windings 88 and 83 respectively and these voltages may be used to actuate any desired remote signalling device or follow-up or control mechanism (not shown) to indicate the instantaneous values of roll and pitch of the craft.

Figure 5:
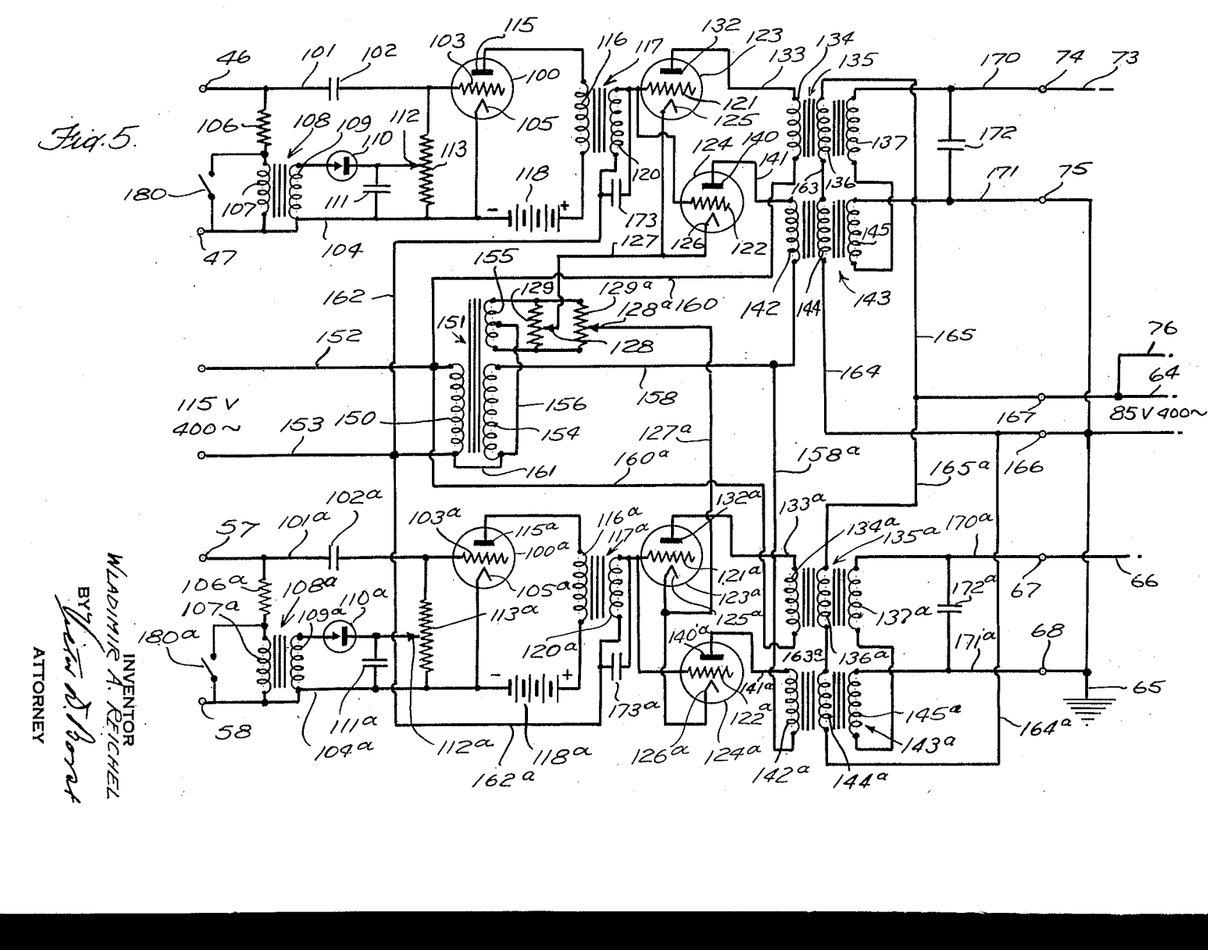
Fig. 5 is a schematic diagram of the amplifier.

Referring to Fig. 5, the input terminals 46 and 47 of the amplifier are shown as connected to the input circuit of an amplifier tube 100. For this purpose the terminal 46 is connected by a lead 101 and a blocking condenser 102 to the grid 103 of the tube 100 and the input terminal 47 is connected by a lead 104 to the cathode 105 of the tube 100. A resistor 106 and a primary 107 of a transformer 108 are connected in series between the leads 101 and 104. The secondary 109 of the transformer 108 is connected to a series circuit including a rectifier 110 and a condenser 111. The condenser 111 is connected across an adjustable tap 112 and one end of a resistor 113 which is connected between the grid 103 and cathode 105 of the tube 100. The anode 115 of the tube 100 is connected through the primary 116 of an output transformer 117 to the positive terminal of a source 118 of plate potential indicated as a battery, the negative end of which is connected to the cathode 105.

One end of the secondary 120 of the transformer 117 is connected to grids 121 and 122 of amplifier tubes 123 and 124 respectively in parallel. The cathodes 125 and 126 of the tubes 123 and 124 respectively are connected by a common lead 127 to an adjustable tap 128 of a resistor 129.

The anode 132 of the tube 123 is connected by a lead 133 to one end of a saturating winding 134 of a saturable core transformer 135 having a primary winding 136 and a secondary winding 137. The anode 140 of the amplifier tube 124 is connected by a lead 141 to one end of a saturating winding 142 of a saturable core transformer 143 having a primary winding 144 and a secondary winding 145.

The primary 150 of a transformer 151 is connected by leads 152 and 153 to a suitable source of power supply such as a 115 volt 400 cycle source which is in phase with the voltage in the supply line 41 (Fig. 4). The transformer 151 is provided with two secondaries 154 and 155. The resistor 129 is connected across the secondary 155, the center point of which is connected by a lead 156 to one end of the secondary 154. The other end of the secondary 154 is connected by a lead 158 to the return side of the saturating winding 142 of the transformer 143. The return side of the saturating winding 134 of the transformer 135 is connected by a lead 160 to the power supply lead 152 on the primary side of the transformer 151. The end of the primary 150, which is connected to lead 153 of the power supply and the end of the secondary 154 which is connected to lead 156 are joined by a lead 161. The return side of the secondary 120 of the transformer 117 is connected by a lead 162 to the power supply lead 153.

The primaries 136 and 144 of the transformers 135 and 143 are connected in series by leads 163, 164 and 165 to power supply terminals 166 and 167 which are connected to the power supply line 64 providing suitable operating voltage, such as 85 volts, 400 cycles.

The secondaries 137 and 145 of the transformers 135 and 143 are connected in series opposition by leads 170 and 171 to the output terminals 74 and 75 of the amplifier. A condenser 172 for controlling the phase of the output signal is connected across the terminal leads 170 and 171. A condenser 173 is also shown as connected across the secondary 120 of the transformer 117.

The channel between the input terminals 57 and 58 and the output terminals 67 and 68 is similar to that described above and the elements have been given corresponding reference numerals with the suffix "a."

In the operation of this amplifier the signal at the input terminals 46 and 47 produces a change in the grid potential of the amplifier tube 100 which causes a corresponding change in the current flowing in the output circuit of this tube. This output current is supplied through the transformer 117 to the tubes 123 and 124 and causes current flow in the saturating windings 134 and 142 of the saturable core transformers 135 and 143. The connections are such that with no signal supplied to the input of the amplifier tube 100 equal currents flow in the saturating windings 134 and 142 in the output circuits of the tubes 123 and 124. When a signal is applied to the input circuit of the tube 100, however, it is amplified therein and causes a change in the potential of the grids 121 and 122. It is to be noted that the anodes 132 and 140 of the tubes 123 and 124 are supplied with alternating current and are maintained 180 degrees out of phase since one anode is supplied from the primary and one from the secondary of the transformer 151. Since the signals supplied to the input terminals 46 and 47 are of 400 cycles due to the energization of the winding 39 from the 400 cycle line 41 (Fig. 4) and the voltage and phase of this signal depends upon the relative position of the rotor winding 44, it is evident that the current flowing through one of the saturating windings 134, 142 will be increased when the other decreases, depending upon the phase relationship of the input signal. This will change the reluctance of the two magnetic paths and will unbalance the voltages produced in the secondaries 137 and 145 causing one voltage or the other to predominate. Hence the signal supplied to the output terminals 74 and 75 will constitute a 400-cycle signal the amplitude and phase of which depends upon the input signal. This signal, as shown in Fig. 4, is supplied to the control winding 72 of the torque motor 24 and will cause a torque to be developed in one direction or the other in the rotor 70 thereof depending upon the value and phase of the input signal received at the terminals 46 and 47.

In a similar manner the signal supplied to the input terminals 57 and 58 of the amplifier produces an output voltage at the terminals 67 and 68 which is suited to produce a torque in the rotor 60 of the torque motor 25 in a direction dependent upon the phasing of the input signal.

It will be noted that the current supplied to the control windings 62 and 72 of the torque motors is dependent upon the signal strength. Hence the precessing torque developed by the motors and the consequent rate of precession of the gyroscope is proportional to the relative angular displacement of the spin axis of the gyroscope from the pendulums. The correction rate is thus varied with the correction angle so as to obtain a rapid and accurate correction without hunting. This correction rate may be varied by adjustment of the motor excitation and of the control circuits.

Due to the transformer 108, rectifier 110 and condenser 111, a biasing voltage is built up across the resistor 113 which varies with the signal voltage. This biasing voltage increases the negative bias on the grid 103 of the tube 100 and when it reaches a certain value will block the tube 100 against further amplification of the incoming signal. The transformer 108 is so designed that the tube 100 will become blocked when the incoming signal corresponds to a predetermined deflection of the pendulum with respect to the gyroscope. The system may be designed, for example, so that a five degree displacement of the pendulum produces a 1¼ volt signal at the input terminals 46 and 47. In that event, if it is desired to cut off the pendulum control of the gyroscope when the displacement equals five degrees, the cut-off circuit may be adjusted to block the amplifier tube 100 when the signal at the input terminals exceeds 1¼ volts. When the amplifier tube 100 is thus blocked, equal space currents will flow into the tubes 123 and 124 and the secondaries 137 and 145 will again produce equal and opposite voltages and no resultant voltage will be supplied at the output terminals 74 and 75. No further torque is then developed by the torque motor 24 and the gyroscope becomes free until the relative angles return to a value at which the tube 100 becomes unblocked and allows the control circuit to again function.

The system thus prevents the gyroscope from following sudden and wide swings of the pendulums such as would occur in response to acceleration forces and produces a stable control. It is obvious that the two pendulums may be combined as a single pendulum mounted for universal movement and connected to actuate the two transmission units.

A switch 180 is connected to short circuit the primary 107 of the transformer 108 when it is desired to eliminate this cut-off feature. With the switch 180 closed the input signal to the tube 100 will cause a precessing force to be applied to the torque motor 24 of the gyroscope whenever the signal is greater than zero. The switch 180 may be closed for example when it is desired to erect the gyroscope from a position more than five degrees from vertical. After the gyroscope has been brought into agreement within five degrees with the pendulum 30, the switch 180 may be opened to allow the control to operate automatically. Thereafter the precessing force will be applied to the gyroscope in response to any variation in the position of the spin axis from that of the corresponding pendulum 30, but the control will be automatically interrupted whenever the pendulum is caused to move excessively due for example to acceleration and deceleration forces. A similar effect is produced in the channel connected between input terminals 57, 58 and output terminals 67, 68 to interrupt the signal to the torque motor 25 when the pendulum 28 is displaced by acceleration forces.

Figure 1:
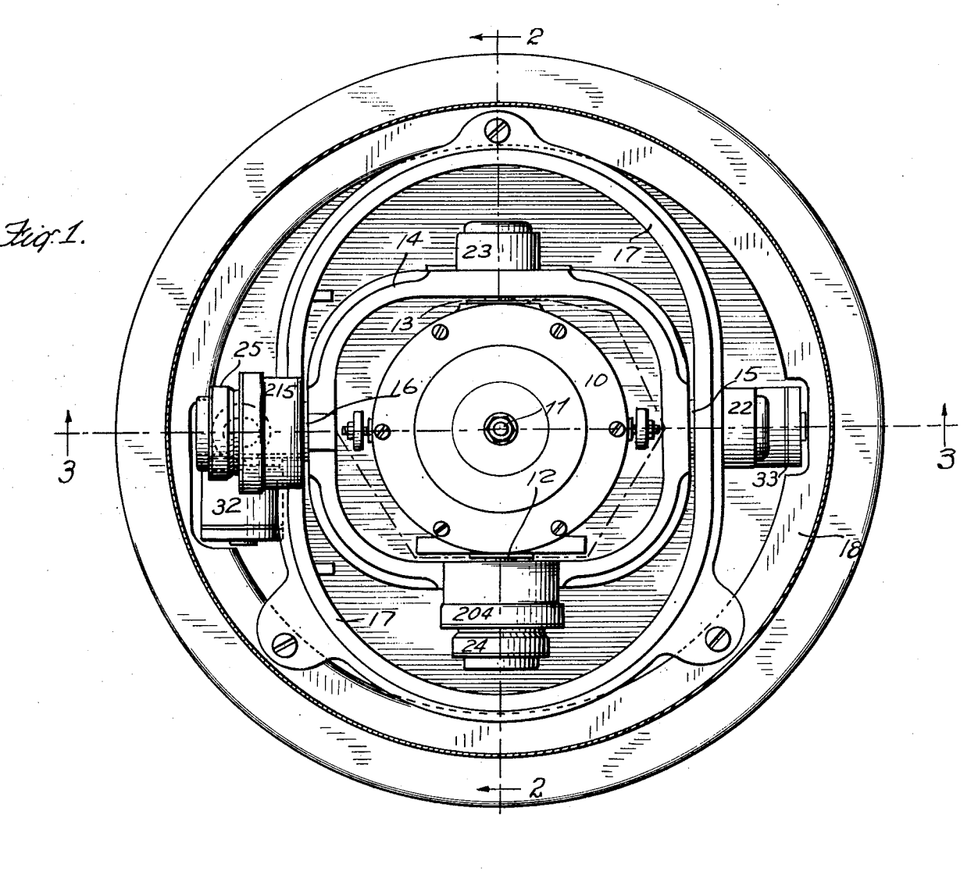
Fig. 1 is a top plan view, partly in section along the line 1—1 of Fig. 3, showing a gyroscope assembly embodying the present invention.
Figure 2:
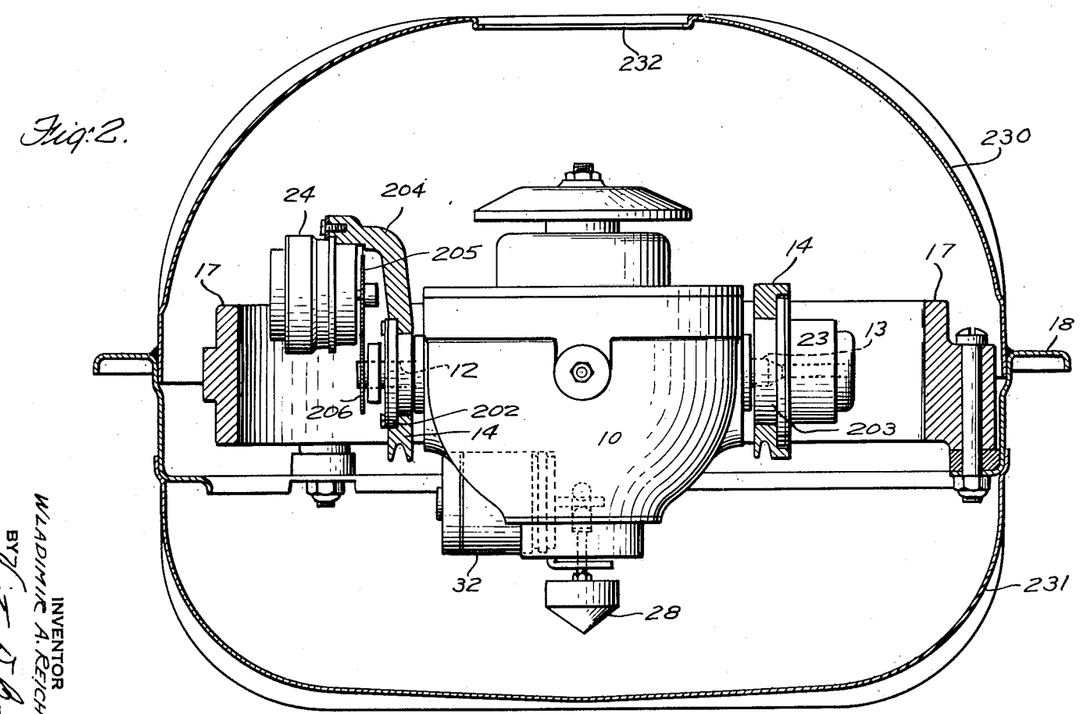
Fig. 2 is a vertical section taken on the line 2—2 of Fig. 1.
Figure 3:
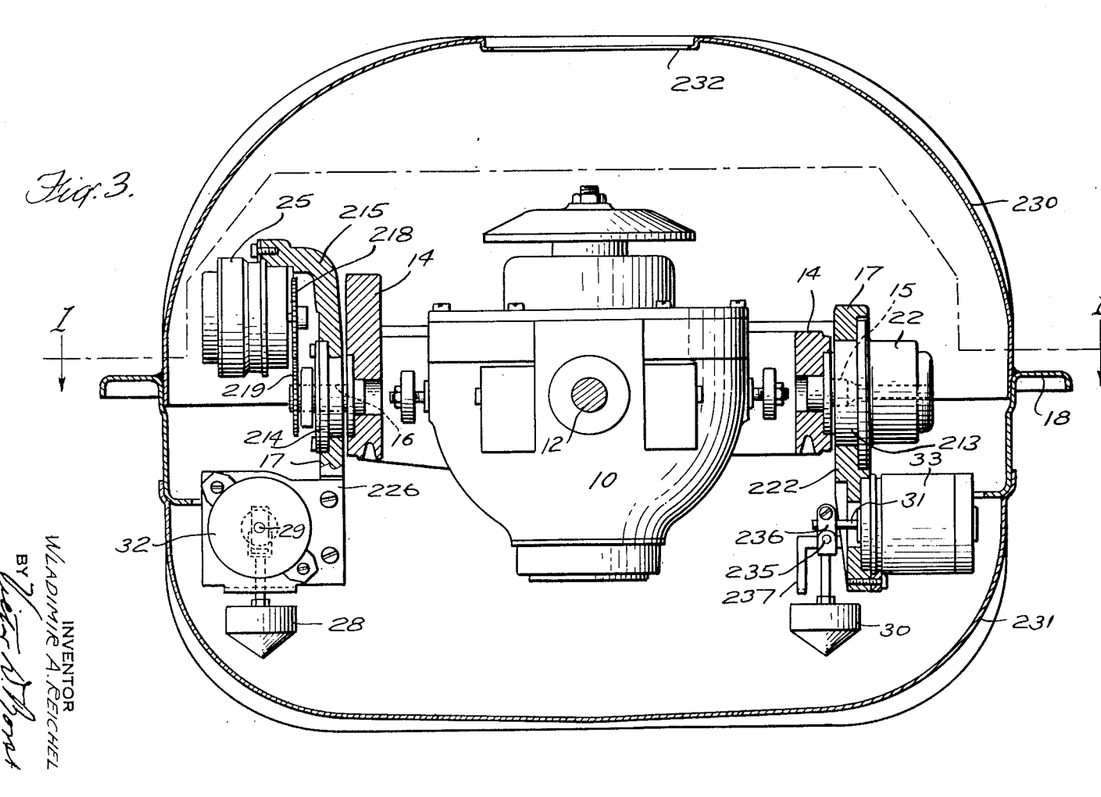
Fig. 3 is a vertical section taken along the line 3—3 of Fig. 1.

In Figs. 1, 2 and 3, the mounting of the gyroscope housing 10 and the pendulums 28 and 30 is shown in greater detail than in Fig. 4. The trunnions 12 and 13 (Fig. 2) of gyroscope housing 10 are journalled in suitable bearings 202 and 203 mounted on the gimbal ring 14. The trunnion 13 and bearing 203 carry the rotor and stator respectively of the transmitter unit 23 which is of standard construction and includes stator and rotor windings 50 and 51 (Fig. 4) either of which may be mounted to rotate with the trunnion 13. The torque motor 24 is mounted on a bracket 204 forming a part of the gimbal ring 14 and is geared by gears 205 and 206 to the trunnion 12. The torque motor 24 is likewise of standard construction and may comprise a two-phase induction motor of any suitable type having a squirrel cage rotor 70 and field windings 71 and 72 (Fig. 4).

As seen in Fig. 3, the trunnions 15 and 16 of the gimbal ring 14 are journalled in bearings 213 and 214 respectively carried by the frame 17. The trunnion 15 and bearing 213 support the rotor and stator of the transmitter unit 22, which is the same as unit 23, and includes windings 38 and 39 (Fig. 4) either one of which may be mounted to rotate with trunnion 15. A torque motor 25 which is similar to the motor 24 and includes rotor 60 and field windings 61 and 62 (Fig. 4), is mounted on a bracket 215 carried by the frame 17. The rotor 60 is connected by gears 218 and 219 to trunnion 16. The frame 17 is attached to the support 18 shown as a ring which is secured in a normally horizontal plane on the craft.

The unit 33 of the transmission system is mounted on a bracket 222 carried by the frame 17. The pendulum 30 is attached to the shaft 31 of the rotor of this unit. The mounting of the unit is such that the shaft 31 is positioned with its axis parallel to the axis of the trunnions 15 and 16.

A similar unit 32 of the transmission system is mounted on a bracket 226 attached to the frame 17. The shaft 29 of the rotor of unit 32 carries pendulum 28 and is mounted with its axis parallel to the axis of the trunnions 12 and 13. The units 32 and 33 are similar to the transmitter units 22 and 23, but are commonly known as control transformers because the rotor windings 44 and 55 are connected to the grid circuit of an amplifier so that substantially no reaction is placed upon the controlling transmitter units when the respective rotors are displaced.

The support 18 is shown as carrying a top casing 230 and a bottom casing 231 which enclose the gyroscope assembly. The top casing 230 is provided with an opening 232 through which the action of the gyroscope may be observed and through which a suitable caging device may be inserted.

The pendulum 30 is pivoted by a pin 235 to a link 236 attached to the shaft 31 so as to permit limited swinging movement of the pendulum about an axis normal to the axis of the shaft 31. A stop 237 is provided to limit the swinging movement of the pendulum 30 about the axis of the pin 235. The pendulum 28 is similarly mounted for swinging movement about an axis normal to that of the shaft 29. This freedom of movement of the pendulums 28 and 30 prevents any bending force from being applied to their respective shafts and reduces the frictional load on their respective bearings.

It will be noted that the above system provides a gyro-erecting control which operates continuously to maintain the gyro axis vertical and is prevented from following spurious swings of the pendulums due to external forces. The control rate is proportioned to the error and may be readily varied by adjustment of the control circuits. The system is particularly suited for heavy aircraft.

Although a specific embodiment of the invention has been shown for purposes of illustration, it is to be understood that various changes and modifications may be made therein as will be readily apparent to a person skilled in the art. The invention is only to be restricted in accordance with the scope of the following claims.

What is claimed is:

1. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means interconnecting the respective units to produce signals representing angular deviations of the gyroscope from the positions of the pendulums, and torque motors responsive to said signals mounted to apply precessing torques to said gyroscope about said axes so as to maintain a predetermined angular relationship between the spin axis of said gyroscope and the positions of said pendulums.

2. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means interconnecting the respective units to produce signals respresenting angular deviations of the gyroscope from the positions of the pendulums, torque motors mounted to apply precessing torques to said gyroscope about said axes, means responsive to said signals to energize said torque motors to apply said precessing torques in a direction to maintain a predetermined angular relationship between the spin axis of said gyroscope and the positions of said pendulums, and means responsive to a predetermined signal value to interrupt said energization and release said gyroscope from the control of said pendulums, whereby the gyroscope is prevented from following excessive swings of said pendulums.

3. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means interconnecting the respective units to produce signals representing angular deviations of the gyroscope from the positions of the pendulums, torque motors mounted to apply precessing torques to said gyroscope about said axes, and means including an amplifier channel responsive to said signals connected to energize said torque motors to apply said precessing torques in a direction to maintain a predetermined angular relationship between the spin axis of said gyroscope and the positions of said pendulums.

4. A gyroscope erecting system comprising a gyroscope, gimbal means mounting said gyroscope for pivotal movement about a pair of axes normal to each other, a pair of pendulums mounted to pivot above axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means inter- connecting the respective units to produce signals of phase and value representing deviations in direction and amount of the gyroscope from the positions of the pendulums, torque motors mounted to apply precessing torques to said gyroscope about said axes, and means including an amplifier channel responsive to said signals connected to energize said torque motors to apply said precessing torques in a direction to maintain a predetermined angular relationship between the spin axis of said gyroscope and the positions of said pendulums, and means responsive to a predetermined signal value to block said amplifier channels so as to interrupt said energization and release said gyroscope from the control of said pendulums, whereby said gyroscope is prevented from following excessive swings of said pendulums.

5. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means interconnecting the respective units to produce signals representing angular deviations of the gyroscope from the positions of the pendulums, said units each including rotor and stator windings, means energizing the rotor windings of the gyro-controlled units with an alternating voltage, leads connecting the stators of the gyro-controlled units to the stators of the pendulum-controlled units, amplifier channels, leads connecting the rotors of the pendulum-controlled units to the inputs of said amplifier channels, torque motors including control windings and induction rotors mounted to apply precessing torques to said gyroscope about said axes, and leads connecting the outputs of said amplifier channels to energize said control windings so as to cause said rotors to apply precessing torques for erecting said gyroscope.

6. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by relative pivotal movement of said gyroscope and of said pendulums about the respective axes to produce signals of phase and value representing angular deviations of the gyroscope from the positions of the pendulums, said units including rotor and stator windings, means energizing the rotor windings of the gyro-controlled units with an alternating voltage, leads connecting the stators of the gyro-controlled units to the stators of the pendulum-controlled units, amplifier channels, means connecting the rotors of the pendulum-controlled units to the inputs of said amplifier channels, torque motors including control windings and induction rotors mounted to apply precessing torques to said gyroscope about said axes, and means connecting the outputs of said amplifier channels to energize said control windings so as to cause said rotors to apply precessing torques for erecting said gyroscope, and means responsive to signal values representing a predetermined angular deviation of the spin axis of said gyroscope from the position of said pendulum to block said amplifier channels and release said gyroscope from the control of said pendulums whereby said gyroscope is prevented from following excessive swings of said pendulums.

7. A gyroscope erecting system comprising a gyroscope, gimbal means mounting said gyroscope for pivotal movement about a pair of axes normal to each other, a pair of pendulums mounted to pivot about axes parallel to said first axes, units of an electrical synchronous transmission system connected to be actuated by pivotal movement of said gyroscope about the respective axes, additional units of said electrical synchronous transmission system connected to be actuated by pivotal movement of said pendulums about the respective axes, means interconnecting the respective units to produce signals representing angular deviations of the gyroscope from the positions of the pendulums, torque motors mounted to apply precessing torques to said gyroscope about said axes, and means including an amplifier channel responsive to said signals to energize said torque motors to apply said precessing torques in a direction to maintain a predetermined relationship between the spin axis of said gyroscope and the positions of said pendulums, said amplifier channels including saturable core transformers having primaries energized from a source of alternating current, secondaries connected in opposition to supply energizing current to said torque motors, and saturating windings connected for balanced excitation and having means responsive to said signals to unbalance said excitation.

8. A gyroscope assembly comprising a gyroscope, gimbal means including trunnions mounting said gyroscope for movement about a pair of axes normal to each other, units of an electrical synchronous transmission system having rotors mounted to turn with said trunnions about each of said axes, a pair of torque motors mounted respectively for rotation about axes parallel to each of said first axes and means connecting said motors to apply precessing torques to said gyroscope about the respective axes, pendulous means mounted to swing about axes parallel to each of said first axes, units of the synchronous transmission system having rotors mounted to turn in response to swinging movement of the pendulous means about their axes, and means actuated by relative angular movement of the rotors of said units for energizing said first and second torque motors.

9. A gyroscope assembly comprising a gyroscope, gimbal means including trunnions mounting said gyroscope for movement about a pair of axes normal to each other, units of an electrical synchronous transmission system having rotors mounted to turn with said trunnions about each of said axes, a pair of torque motors mounted respectively for rotation about axes parallel to each of said first axes and means connecting said motors to apply precessing torques to said gyroscope about the respective axes, pendulous means mounted to swing about axes parallel to each of said first axes, units of the synchronous transmission system having rotors mounted to turn in response to swinging movement of the pendulous means about their axes, means including said synchronous transmission system responsive to the direction and amount of angular displacement between the rotors of said first and second units to actuate said torque motors so as to apply precessing torques to said gyroscope which vary with said displacement.

10. A gyroscope assembly comprising a gyroscope, gimbal means including trunnions mounting said gyroscope for movement about a pair of axes normal to each other, units of an electrical synchronous transmission system having rotors mounted to turn with said trunnions about each of said axes, a pair of torque motors mounted respectively for rotation about axes parallel to each of said first axes and means connecting said motors to apply precessing torques to said gyroscope about the respective axes, pendulous means mounted to swing about axes parallel to each of said first axes, units of the synchronous transmission system having rotors mounted to turn in response to swing movement of the pendulous means about their axes, means including said synchronous transmission system responsive to the direction and amount of angular displacement between the rotors of said first and second units to actuate said torque motors so as to apply precessing torques to said gyroscope which vary with said displacement, and means rendering said last means ineffective when said displacement exceeds a predetermined value whereby said gyroscope is prevented from following excessive swings of said pendulums.

11. A gyroscope assembly comprising a gyroscope, gimbal means including trunnions mounting said gyroscope for movement about a pair of axes normal to each other, units of an electrical synchronous transmission system having rotors mounted to turn with said trunnions about each of said axes, a pair of torque motors mounted respectively for rotation about axes parallel to each of said first axes and means connecting said motors to apply precessing torques to said gyroscope about the respective axes, pendulous means mounted to swing about axes parallel to each of said first axes, units of the synchronous transmission system having rotors mounted to turn in response to swinging movement of the pendulous means about their axes, means including said synchronous transmission system responsive to the direction and amount of angular displacement between the rotors of said first and second units to actuate said torque motors so as to apply precessing torques to said gyroscope which vary with said displacement, means rendering said last means ineffective when said displacement exceeds a predetermined value whereby said gyroscope is prevented from following excessive swings of said pendulums, and manual means to render said last means ineffective so as to restore said spin axis from a displacement in excess of said predetermined value.

WLADIMIR A. REICHEL.

REFERENCES CITED

The following references are of record in the file of this patent:

UNITED STATES PATENTS

| Number | Name | Date |
| --- | --- | --- |
| 1,942,737 | Wood | Jan. 9, 1934 |
| 2,382,993 | Haskins, Jr. | Aug. 21, 1945 |
| 2,417,573 | Strother | Mar. 18, 1947 |

FOREIGN PATENTS

| Number | Country | Date |
| --- | --- | --- |
| 345,127 | Great Britain | Mar. 19, 1931 |